(12) United States Patent
Cao et al.

(10) Patent No.: US 12,047,653 B2
(45) Date of Patent: Jul. 23, 2024

(54) COMPUTERIZED SYSTEMS AND METHODS FOR AUTOMATIC GENERATION OF LIVESTREAM ENGAGEMENT ENHANCING FEATURES

(71) Applicant: COUPANG CORP., Seoul (KR)

(72) Inventors: Yi Cao, Shanghai (CN); Xin Wei, Shanghai (CN); Jun Hang, Shanghai (CN); Wei Luo, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/934,610

(22) Filed: Sep. 23, 2022

(65) Prior Publication Data
US 2024/0107121 A1    Mar. 28, 2024

(51) Int. Cl.
| | |
|---|---|
| H04N 21/4788 | (2011.01) |
| G06F 3/0482 | (2013.01) |
| H04L 67/50 | (2022.01) |
| H04N 21/2187 | (2011.01) |
| H04N 21/478 | (2011.01) |

(52) U.S. Cl.
CPC ....... *H04N 21/4788* (2013.01); *G06F 3/0482* (2013.01); *H04L 67/535* (2022.05); *H04N 21/2187* (2013.01); *H04N 21/47815* (2013.01)

(58) Field of Classification Search
CPC .......... H04N 21/4788; H04N 21/2187; H04N 21/47815; H04L 67/535; G06F 3/0482
USPC ...................................................... 709/204
See application file for complete search history.

(56) References Cited

U.S. PATENT DOCUMENTS

| | | | | |
|---|---|---|---|---|
| 10,997,240 | B1 * | 5/2021 | Aschner | H04L 67/535 |
| 11,115,722 | B2 * | 9/2021 | Johnson | H04N 21/4788 |
| 11,257,171 | B2 * | 2/2022 | Benfield | G06F 16/43 |

(Continued)

FOREIGN PATENT DOCUMENTS

| | | | | |
|---|---|---|---|---|
| CN | 112601105 | A * | 4/2021 | |
| CN | 113055751 | A * | 6/2021 | H04N 21/435 |

(Continued)

OTHER PUBLICATIONS

Anne Mollen, Hugh Wilson, Engagement, telepresence and interactivity in online consumer experience: Reconciling scholastic and managerial perspectives, Journal of Business Research, vol. 63, Issues 9-10, 2010, pp. 919-925. (Year: 2010).*

(Continued)

*Primary Examiner* — Melvin H Pollack
(74) *Attorney, Agent, or Firm* — FINNEGAN, HENDERSON, FARABOW, GARRETT & DUNNER LLP

(57) ABSTRACT

Computer-implemented systems and methods for livestream engagement enhancement are disclosed and may be configured to retrieve a first set of texts; retrieve a second set of texts; transmit a plurality of texts including at least the first and second set of texts for display on one or more user interfaces associated with one or more user devices; receive user interaction data from at least one of the one or more user devices, wherein the user interaction data includes indication of user interaction by one or more users with at least one or more texts of the plurality of texts via at least one of the one or more user interfaces; and transmit each text of the one or more texts to a second user device for display on at least one of a first page or a second page of a second user interface.

20 Claims, 20 Drawing Sheets

(56) References Cited

U.S. PATENT DOCUMENTS

| | | | |
|---|---|---|---|
| 11,263,268 B1* | 3/2022 | Bourbie | G06F 16/2228 |
| 11,288,240 B1* | 3/2022 | Sayad | G06F 16/906 |
| 11,297,030 B2* | 4/2022 | Oliner | G06F 16/9535 |
| 11,394,824 B2* | 7/2022 | Kats | H04M 1/2757 |
| 11,567,981 B2* | 1/2023 | Bui | G06N 5/04 |
| 11,580,305 B2* | 2/2023 | Olsen | G06F 16/93 |
| 11,636,128 B1* | 4/2023 | Bigdelu | G06F 16/2428 707/722 |
| 11,644,955 B1* | 5/2023 | Singamneni | G06F 16/248 707/722 |
| 11,651,043 B2* | 5/2023 | Panuganty | G06F 16/24578 707/723 |
| 11,665,284 B2* | 5/2023 | Jorasch | H04N 7/147 709/204 |
| 11,676,072 B1* | 6/2023 | Chandrasekharan | G06F 16/22 706/12 |
| 11,677,575 B1* | 6/2023 | Libin | H04L 12/1831 709/204 |
| 11,689,592 B2* | 6/2023 | Aichinger | H04L 65/403 709/204 |
| 11,699,023 B2* | 7/2023 | Le Chevalier | G06F 3/011 715/204 |
| 11,700,426 B2* | 7/2023 | Williams | H04N 21/8547 725/37 |
| 11,741,949 B2* | 8/2023 | Rose | H04L 51/046 704/232 |
| 11,755,636 B2* | 9/2023 | Oberoi | G06N 3/04 707/736 |
| 11,757,666 B2* | 9/2023 | Lin | H04N 7/15 709/204 |
| 2014/0025371 A1 | 1/2014 | Min | |
| 2015/0304437 A1* | 10/2015 | Vaccari | G06F 16/28 709/204 |
| 2015/0319264 A1* | 11/2015 | Allen | H04L 67/535 709/204 |
| 2016/0119413 A1* | 4/2016 | Antipa | H04L 67/1095 709/204 |
| 2016/0164982 A1* | 6/2016 | LeBeau | G06Q 50/01 709/204 |
| 2018/0040020 A1 | 2/2018 | Kurian et al. | |
| 2018/0225725 A1* | 8/2018 | Paul | H04N 21/812 |
| 2020/0265195 A1 | 8/2020 | Galitsky | |
| 2022/0156030 A1* | 5/2022 | Walmsley | H04N 7/15 709/204 |
| 2022/0179665 A1* | 6/2022 | Rathod | G06F 9/451 |
| 2022/0191594 A1* | 6/2022 | Devoy, III | H04N 21/2187 |
| 2022/0293107 A1* | 9/2022 | Leaman | G06F 16/951 |
| 2022/0355212 A1* | 11/2022 | Louden | G10L 25/57 |
| 2022/0385979 A1* | 12/2022 | Zhou | G06F 40/30 |
| 2022/0405862 A1* | 12/2022 | Narayan | G06Q 50/01 |
| 2023/0134143 A1* | 5/2023 | Chau | G06V 10/507 709/204 |
| 2023/0199039 A1* | 6/2023 | Nguyen | H04L 65/4025 709/204 |
| 2023/0239168 A1* | 7/2023 | Prasad | H04N 7/152 709/204 |
| 2023/0246861 A1* | 8/2023 | Waibel | H04L 12/1818 709/204 |
| 2023/0283855 A1* | 9/2023 | Chen | H04N 21/4788 386/244 |

FOREIGN PATENT DOCUMENTS

| | | | |
|---|---|---|---|
| CN | 113058270 A | | 7/2021 |
| CN | 114095749 B | * | 12/2022 |
| KR | 10-2022-0074574 A1 | | 6/2022 |
| KR | 102413335 B1 | * | 6/2022 |
| KR | 102503854 B1 | * | 2/2023 ....... H04N 21/44008 |

OTHER PUBLICATIONS

Attfield, S., Kazai, G., Lalmas, M., & Piwowarski, B. (Feb. 2011). Towards a science of user engagement (position paper). In WSDM workshop on user modelling for Web applications (vol. 1). (Year: 2011).*

Apiradee Wongkitrungrueng, Nuttapol Assarut, The role of live streaming in building consumer trust and engagement with social commerce sellers, Journal of Business Research, vol. 117, 2020, pp. 543-556. (Year: 2020).*

International Search Report and Written Opinion of the International Search Authority in counterpart International Application No. PCT/IB2023/055436 dated Sep. 18, 2023 (9 pages).

* cited by examiner

FIG. 1D ns and methods for automatic generation of livestream engagement enhancing features. In particular, embodiments of the present disclosure relate to inventive and unconventional systems for automatically generating livestream engagement features by retrieving and dynamically analyzing real-time user interaction data to display user interface (UI) elements in an organized and personalized manner, resulting in improved user interfaces for engagement enhancement.

COMPUTERIZED SYSTEMS AND METHODS FOR AUTOMATIC GENERATION OF LIVESTREAM ENGAGEMENT ENHANCING FEATURES

TECHNICAL FIELD

The present disclosure generally relates to computerized systems and methods for automatic generation of livestream engagement enhancing features. In particular, embodiments of the present disclosure relate to inventive and unconventional systems for automatically generating livestream engagement features by retrieving and dynamically analyzing real-time user interaction data to display user interface (UI) elements in an organized and personalized manner, resulting in improved user interfaces for engagement enhancement.

BACKGROUND

Livestream e-commerce platforms provide opportunities for both sellers and customers to interact with one another through real-time broadcasting. During a livestream, customers may send chats to inquire the person (i.e., creator) discussing products featured in the livestream to help in making decisions related to purchases. In addition, livestreams may promote products by encouraging customers to participate in special events or missions to earn rewards such as discounts and coupons for featured products. However, customers may often not know what questions to ask or may not be capable of acting quickly enough to participate in the special events or missions due to confusing or disorganized interfaces.

To mitigate such problems, conventional text systems implement predictive texts to suggest what users may be trying to say as they type. While these systems attempt to provide improved user interfaces, conventional systems are not capable of automatically presenting suggestions in the form of selectable UI elements based on dynamic analysis of real-time data. Furthermore, conventional systems are not capable of efficiently analyzing a plurality of real-time chats to differentiate between different types of chats (e.g., questions) and provide an organized user interface for creators based on the different types of chats.

Therefore, there is a need for improved methods and systems for automatically generating livestream engagement features by retrieving and dynamically analyzing real-time user interaction data to display UI elements in an organized manner to improve user interfaces for quality engagement.

SUMMARY

One aspect of the present disclosure is directed to a computer-implemented system comprising one or more memory devices storing instructions and one or more processors configured to execute the instructions to perform a method for livestream engagement enhancement. The method includes retrieving, from a database, a first set of texts, and retrieving, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in the database, the organized keywords as the second set of texts. The method further includes transmitting a plurality of texts including at least the first and second set of texts for display on one or more user interfaces associated with one or more user devices, receiving user interaction data from at least one of the one or more user devices, wherein the user interaction data includes indication of user interaction by one or more users with at least one or more texts of the plurality of texts via at least one of the one or more user interfaces, and transmitting each text of the one or more texts to a second user device for display on at least one of a first page or a second page of a second user interface associated with the second user device, wherein transmitting is based on determining a text type of the text, based on the text not being a first text type, transmitting the text for display on the first page of the second user interface, and based on the text being a first text type, transmitting the text for display on the second page of the second user interface.

Another aspect of the present disclosure is directed to a method for livestream engagement enhancement. The method includes retrieving, from a database, a first set of texts, and retrieving, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in the database, the organized keywords as the second set of texts. The method further includes transmitting a plurality of texts including at least the first and second set of texts for display on one or more user interfaces associated with one or more user devices, receiving user interaction data from at least one of the one or more user devices, wherein the user interaction data includes indication of user interaction by one or more users with at least one or more texts of the plurality of texts via at least one of the one or more user interfaces, and transmitting each text of the one or more texts to a second user device for display on at least one of a first page or a second page of a second user interface associated with the second user device, wherein transmitting is based on determining a text type of the text, based on the text not being a first text type, transmitting the text for display on the first page of the second user interface, and based on the text being a first text type, transmitting the text for display on the second page of the second user interface.

Yet another aspect of the present disclosure is directed to a computer-implemented system comprising one or more memory devices storing instructions, and one or more processors configured to execute the instructions to perform a method for livestream engagement enhancement. The method includes retrieving, from a database, a first set of texts, and retrieving, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in the database, the organized keywords as the second set of texts. The method further includes transmitting, during the livestream, a plurality of texts including at least the first and second set of texts for display on a plurality of user interfaces associated with a plurality of user devices, receiving, during the livestream, user interaction data from one or more user devices of the plurality of user devices, wherein the user interaction data includes indication of user interaction by one or more users with at least one or more texts of the plurality of texts via at least one or more interfaces of the plurality of user interfaces, determining, based on the received user interaction data, whether one or more conditions are met, and based on the determination, transmitting, during the livestream, a notification message to one or more second users of the one or more first users.

Other systems, methods, and computer-readable media are also discussed herein.

BRIEF DESCRIPTION OF THE DRAWINGS

Figure 1D:
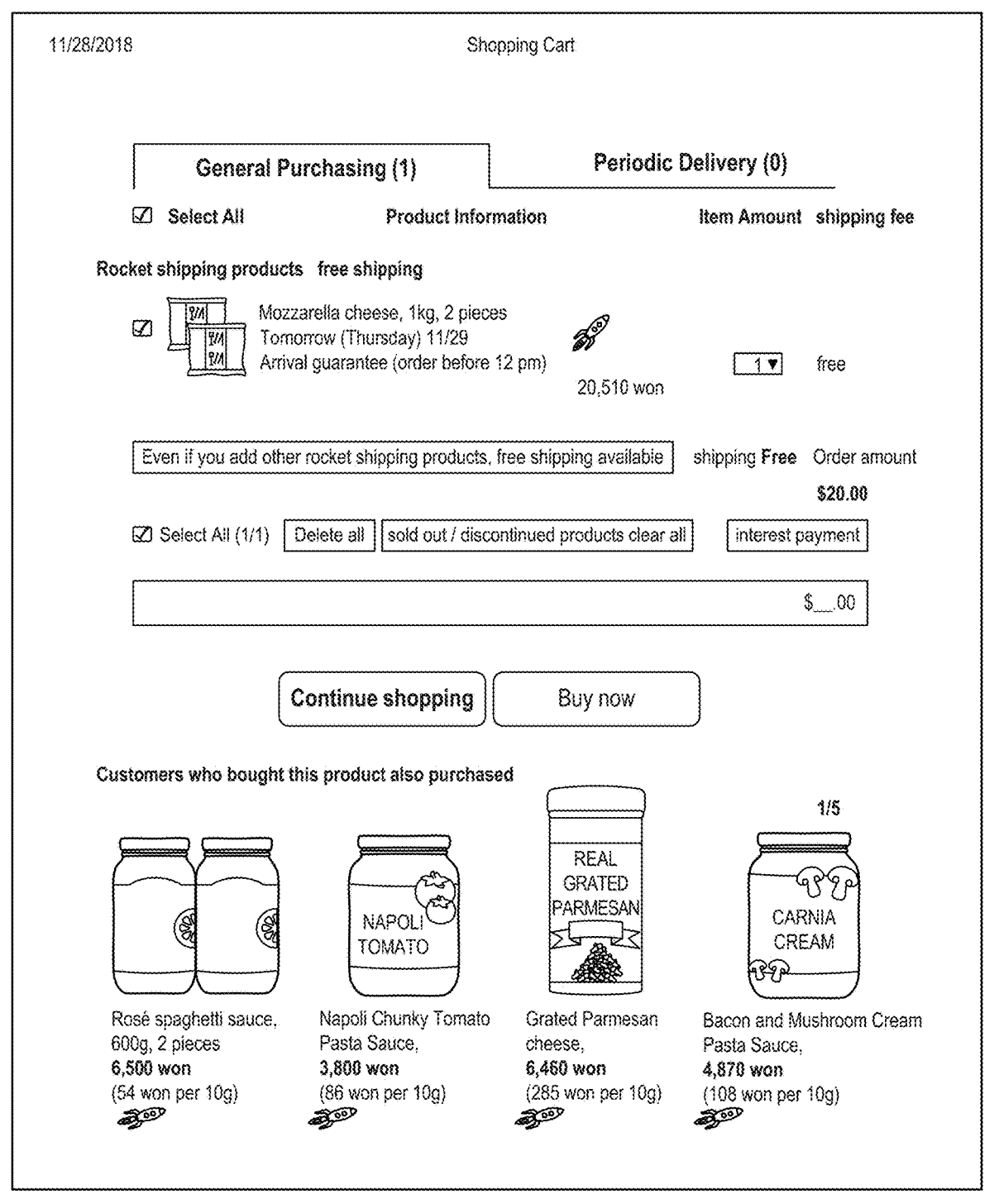

FIG. 1D depicts a sample Cart page that includes items in a virtual shopping cart along with interactive user interface elements, consistent with the disclosed embodiments.

DETAILED DESCRIPTION

Figure 1A:
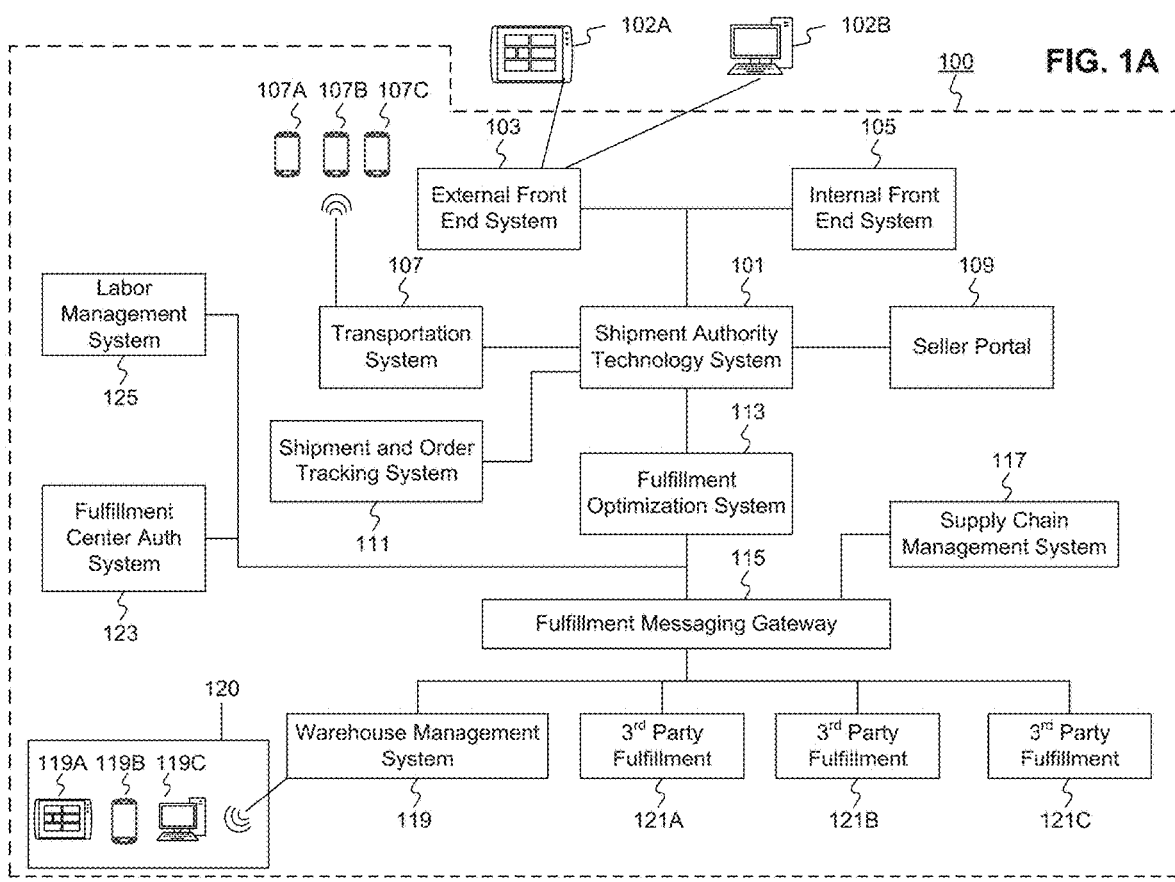
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for livestream engagement enhancement by retrieving, from a database, a first set of texts, and retrieving, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in the database, the organized keywords as the second set of texts. The method further includes transmitting a plurality of texts including at least the first and second set of texts for display on one or more user interfaces associated with one or more user devices, receiving user interaction data from at least one of the one or more user devices, wherein the user interaction data includes indication of user interaction by one or more users with at least one or more texts of the plurality of texts via at least one of the one or more user interfaces, and transmitting each text of the one or more texts to a second user device for display on at least one of a first page or a second page of a second user interface associated with the second user device, wherein transmitting is based on determining a text type of the text, based on the text not being a first text type, transmitting the text for display on the first page of the second user interface, and based on the text being a first text type, transmitting the text for display on the second page of the second user interface. The disclosed embodiments provide innovative technical features that allow for engagement enhancement by providing organized interfaces in an efficient manner. For example, disclosed embodiments enable transmission of a plurality of texts including retrieved texts for display on a plurality of user interfaces associated with a plurality of user devices, enable reception of user interaction data from a plurality of user devices wherein user interaction data includes indication of user interaction by a plurality of users with the plurality of user interfaces, and enable transmission of a plurality of texts for display on a particular page of a second user interface based on determination of a text type associated with each text.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 120), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smart-phones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 120). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 120, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 120, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. During the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 120), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 120, other products may be stored off-site, may be produced on demand, or may be otherwise unavailable for storage in fulfillment center 120. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 120, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
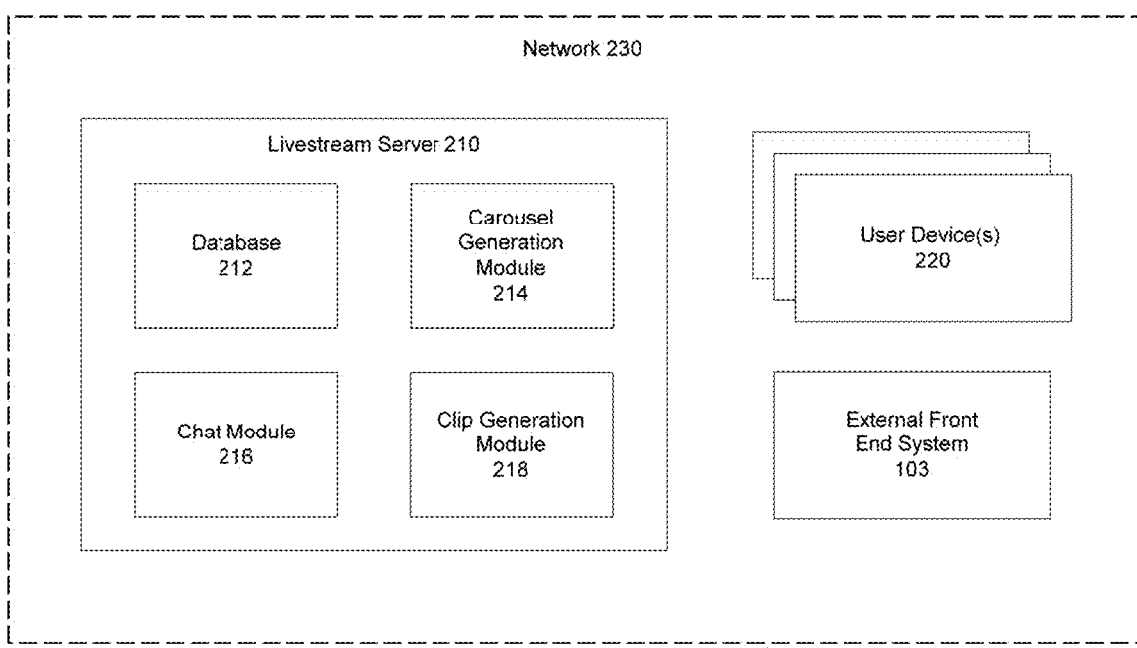
FIG. 2 is schematic block diagram illustrating an exemplary embodiment of a network comprising computerized systems for live e-commerce streaming, consistent with the disclosed embodiments.

FIG. 2 is a schematic block diagram illustrating an exemplary embodiment of a network comprising computerized systems for live e-commerce streaming, consistent with the disclosed embodiments. In FIG. 2, streaming system 200 may include livestream server 210 configured to process data streams in real-time to, for example, allow users (e.g., streamers and viewers) to communicate via livestream to advertise, sell and purchase products. Additionally, livestream server 210 may be configured to provide video-on-demand (VOD) services to users such that they can view livestream videos that have ended livestreaming. System 200 may include livestream server 210, user device(s) 220, external front end system 103, and network 230.

Livestream server 210 may take the form of a server, general-purpose computer, a mainframe computer, a special-purpose computing device such as a graphical processing unit (GPU), laptop, or any combination of these computing devices. In these embodiments, components of livestream server 210 (i.e., database 212, carousel generation module 214, chat module 216, clip generation module 218) may be implemented as one or more functional units performed by one or more processors based on instructions stored in the one or more memories. Livestream server 210 may be a standalone system, or it may be part of a subsystem, which may be part of a larger system.

Database 212 may be implemented as either an internal database or an external database communicatively coupled to livestream server 210 via network 230. Database 212 may be configured to collect and/or maintain data associated with users of livestream server 210. For example, database 212 may store information about preferences and actions associated with users of livestream server 210. Further, database 212 may include a plurality of livestream videos and information related to the plurality of livestream videos. For example, database 212 may include information related to each livestream video such as, but not limited to, a number of views, a frequency of plays, a frequency of seeks, a frequency of likes over time, a frequency of chats over time, a frequency of product keywords spoken over time, a frequency of product boards detected and when, a number of times that a product was added to a user cart over time, a click-through rate (CTR) over time, and a conversion rate (CVR) over time. CVR may be a measure of what proportion of customers are persuaded by a video to add one or more products featured in the video to their respective carts. CTR may be a percentage determined based on the number of times a livestream video is displayed on user interfaces of a VOD platform and a number of times that one or more users click on the displayed livestream video. For example, dividing the number of clicks by the number of impressions (i.e., the number of times the livestream video is displayed), and then multiplying the result by 100 may provide a CTR measurement. Further, database 212 may include a plurality of highlight videos generated from the plurality of livestream videos, discussed in further detail below.

Carousel generation module 214, in some embodiments, may include one or more computing devices configured to generate livestream carousel widgets based on data stored in database 212. For example, carousel generation module 214 may retrieve a plurality of candidate livestreams based on data related to one or more users and data related to a plurality of livestreams, organize the retrieved plurality of candidate livestreams, input data related to a first user and data related to the retrieved plurality of candidate livestreams into a ranking model, such as a ranking neural network, and output a value for each livestream of the organized plurality of candidate livestreams from the ranking model. In addition, based on the outputted value for each livestream, carousel generation module 214 may determine a rank for each livestream of the organized plurality of candidate livestreams, generate a livestream carousel widget including a number of candidate livestreams based on the determined rank, and transmit the generated livestream carousel widget for display on a user interface associated with the first user.

Chat module 216, in some embodiments, may include one or more computing devices configured to enhance livestream engagement. For example, chat module 216 may retrieve, from database 212, a first set of texts and retrieve, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in database 212, the organized keywords as the second set of texts. Additionally, chat module 216 may transmit a plurality of texts including at least the first and second set of texts for display on one or more user interfaces associated with one or more user devices, and receive user interaction data from at least one of the one or more user devices, wherein the user interaction data includes indication of user interaction by one or more users with at least one or more texts of the plurality of texts via at least one of the one or more user interfaces. Furthermore, chat module 216 may transmit each text of the one or more texts to a second user device, wherein transmitting is based on determining whether the text includes a question, transmitting the text for display on a first page of a second user interface associated with the second user device based on the text not including a question, and transmitting the text for display on a second page of the second user interface based on the text including a question.

Clip generation module 218, in some embodiments, may include one or more computing devices configured to automatically generate highlight videos based on source livestream videos stored in database 212. For example, clip generation module 218 may retrieve user action data for a plurality of source videos from database 212 and select a set of source videos of the plurality of source videos to retrieve from database 212. For each of the selected source videos, clip generation module 218 may split the source video into a plurality of segments and, for each segment, determine segment data to calculate a segment highlight score based on the determined segment data. A number of segments may be selected based on the calculated segment highlight scores and clip generation module 218 may generate a new video based on the selected segments.

Alternatively, components of livestream server 210 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

User device(s) 220 may be similar in design, function, or operation to mobile device 102A or computer 102B described above with respect to FIG. 1A. User device(s) 220 may include one or more computing devices configured to perform one or more operations consistent with disclosed embodiments. For example, user device(s) may include a desktop computer, a laptop, a server, a mobile device (e.g., tablet, smart phone, etc.), or other type of computing device capable of running a computer program or software application associated with livestream server 210. For example, a user of user device 220 may download a mobile commerce application to access the services available on livestream server 210. In some embodiments, user device(s) 220 may be part of system 100 (FIG. 1A). User device(s) 220 may navigate to external front end system 103 and request a search by entering information into a search box. In other embodiments, however, user device(s) 220 may be independent from system 100. User device(s) 220 may include one or more processors configured to execute software instructions stored in memory, such as memory included in user device(s) 220, to perform operations to implement the functions described below. User device(s) 220 may be configured for wired and/or wireless communications and may include software that when executed by a processor performs internet-related communication (e.g., TCP/IP) and content display processes. For instance, user device(s) 220 may execute browser software that generates and displays interfaces including content on a display device included in, or connected to, user device(s) 220. User device(s) 220 may execute applications that allow user device(s) 220 to communicate with components over network 230 and display content in interfaces via display devices included in user device(s) 220.

Network 230 may be any type of network configured to provide communications between components of system 200. For example, network 230 may be any type of network (including infrastructure) that provides communications, exchanges information, and/or facilitates the exchange of information, such as the Internet, or other suitable connection(s) that enables the sending and receiving of information between the components of system 200. In other embodiments, network 230 may include multiple networks, organizing for example a network of networks.

Figure 3:
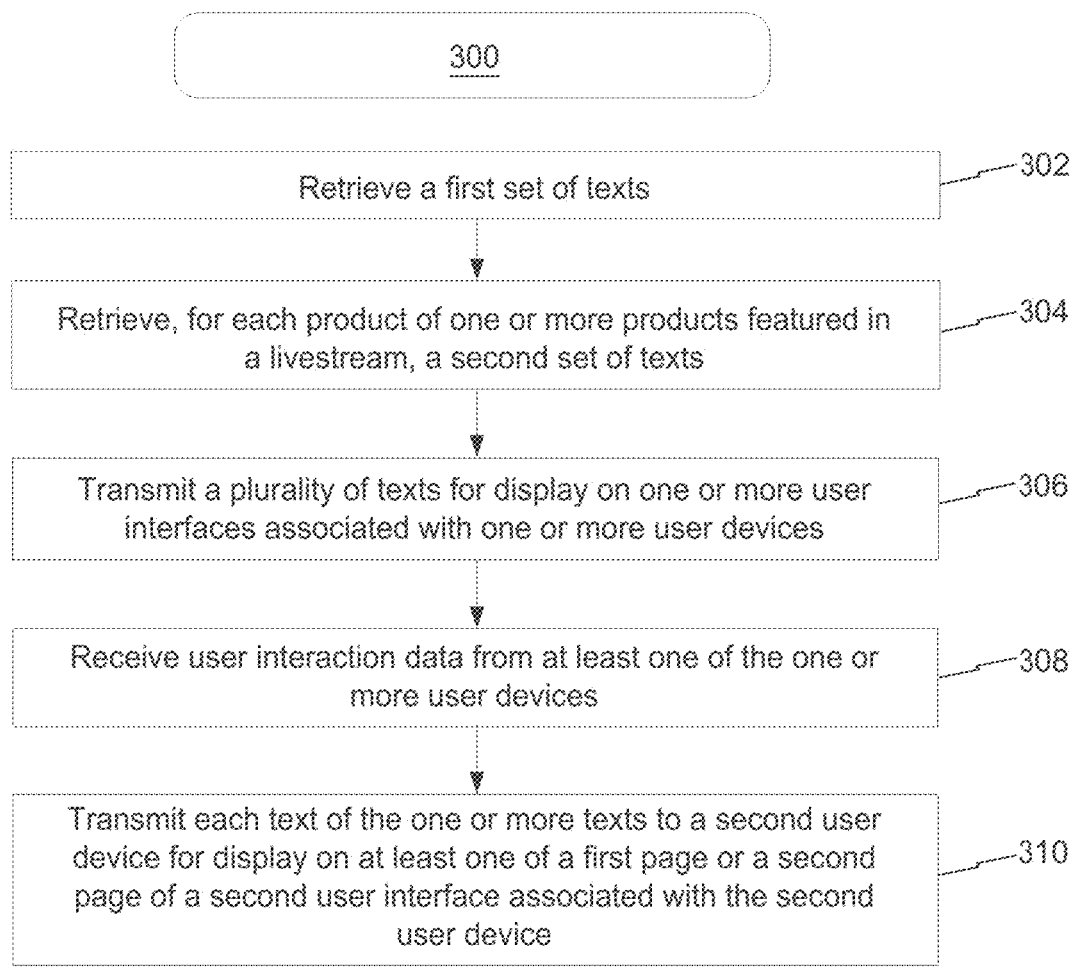
FIG. 3 shows an exemplary method for livestream engagement enhancement, consistent with the disclosed embodiments.

FIG. 3 shows an exemplary method 300 for livestream engagement enhancement. In some embodiments, method 300 or a portion thereof may be performed by chat module 216, while in other embodiments, method 300 or portions thereof may be performed by other components in FIG. 1A or 2. For example, systems may include one or more processors and a memory storing instructions that, when executed by the one or more processors, cause the system to perform the steps shown in FIG. 3.

In step 302, at least one processor may be configured to retrieve a first set of texts. In some embodiments, the first set of texts may include a predetermined set of greetings or reactions. For example, the first set of texts may include generic greetings, such as "Hello" and "Nice to meet you," or reactions, such as "That's so funny," "Well said," and "Cool." Additionally or alternatively, the first set of texts may include a personalized set of texts specific to a particular user. For example, the first set of texts may include one or more personalized texts including one or more texts preset by the particular user in user settings associated with chat module 216, wherein the first set of texts including personalized text is stored in a database for later use. For example, a user device may receive input from a user for one or more personalized texts (e.g., personalized greetings, unique combination of emoticons and/or symbols, etc.) and may also receive input to update user settings such that the first set of texts includes one or more of the personalized texts. In some cases, personalized text may be generated and stored by chat module 216 based on monitoring and tracking texts sent by the particular user within one or more livestreams. In some embodiments, chat module 216 may store in a database (e.g., database 212) a predetermined number of texts most recently sent by users to chat in recently streamed livestreams (e.g., livestreams from the past day, 10 days, 1 month, etc.). Based on the texts, chat module 216 may determine which texts were the most commonly sent by users by determining a number of times each text was sent and ordering the texts based on the number of times they were sent (e.g., highest to lowest number of times sent). Chat module 216 may then include one or more of the highest ranked texts (i.e., texts with the highest number of times sent) in the first set of texts. In some embodiments, the first set of texts may include emoticons. Chat module 216 may retrieve the first set of texts from database 212. Additionally or alternatively, chat module 216 may dynamically update the first set of texts based on real-time data (e.g., trending greetings and/or emoticons sent by users in live chats in a livestream).

In step 304, the at least one processor may be configured to retrieve, for each product of one or more products featured in a livestream, a second set of texts. In some embodiments, the second set of texts may include keywords determined based on previous livestreams associated with the same or similar products. For example, chat module 216 may store interactions (e.g., chats sent by users) from previous and/or currently live streams in a database and retrieve the interactions for a particular product to identify keywords to include in the second set of texts. In some embodiments, chat module 216 may generate the second set of texts by compiling a plurality of keywords in review data associated with the product. For example, chat module 216 may be configured to automatically detect potential keywords (e.g., words specific to a product category) by using a text segmentation algorithm and checking the part-of-speech of each word in review data and/or interactions from previous livestreams. In some cases, chat module 216 may identify certain parts-of-speech (e.g., nouns) as potential keywords. Further, chat module 216 may determine a prevalence value associated with each potential keyword. In some embodiments, determining a prevalence value associated with each potential keyword may comprise counting a number of times each potential keyword was previously mentioned, either in chats and/or in review data. For example, the most common potential keywords (e.g., most common nouns) used by reviewers to leave reviews associated with a makeup product may be words such as "fragrance," "pigmentation," and "moisture-level," and may be determined to be keywords. In some embodiments, chat module 216 may update the second set of texts periodically (e.g., every hour, day, week, etc.). Additionally or alternatively, chat module 216 may dynamically update the review data to include the most up-to-date reviews for compiling keywords. For example, as a stream is being livestreamed, chat module 216 may constantly refresh review data related to products featured in the livestream to compile the latest keywords, which may have changed based on the newest reviews that were made as the stream is being livestreamed. Additionally or alternatively, chat module 216 may be configured to order the keywords in order of prevalence. For example, chat module 216 may be configured to order the keywords from highest prevalence value to lowest prevalence value, or vice versa.

In some embodiments, chat module 216 may select one or more keywords based on the determined prevalence value associated with each keyword. For example, selecting one or more keywords based on the determined prevalence value associated with each keyword may comprise selecting a predetermined number of keywords with the highest prevalence values based on the determined prevalence value associated with each keyword. Additionally or alternatively, chat module 216 may organize the selected one or more keywords. In some embodiments, organizing the selected one or more keywords may include removing keywords included in a first set of omitted keywords. For example, chat module 216 may be configured to remove predetermined generic keywords such as "satisfaction level," "reason for purchase," and "quality." In some embodiments, organizing the selected one or more keywords may include automatically formatting each keyword into a question (e.g., adding a "?" after the keyword). Additionally or alternatively, chat module 216 may store, in the database, the organized keywords as the second set of texts. For example, chat module 216 may store the organized keywords in database 212.

In some embodiments, chat module 216 may be configured to retrieve a third set of texts. In some embodiments, the third set of texts may be generated by receiving, from a second user device, one or more customized texts. For example, the second user device may be a user device associated with a second user (i.e. creator describing product in livestream). Chat module 216 may receive, from the second user device, one or more customized texts, wherein for each customized text of the one or more customized texts, chat module 216 may filter the customized text to determine whether the customized text is restricted. For example, chat module 216 may determine whether the customized text includes any prohibited terms, such as profanity words. In some embodiments, chat module 216 may retrieve a list of prohibited terms stored in a database and may identify prohibited terms by comparing each term to the list of prohibited terms. Additionally or alternatively, chat module 216 may determine whether the customized text is less than a preset number of characters (e.g., 10, 20), wherein each letter, number or emoticon may be counted as a single character. Based on the customized text being restricted, chat module 216 may transmit a notification message to the second user device. For example, chat module 216 may transmit a notification message denying the customized text and explaining reasons for why the customized text is denied to allow the second user to correct the customized text. Based on the customized text not being restricted, chat module 216 may transmit a notification message to the second user device and include the customized text in the third set of texts. For example, chat module 216 may transmit a notification message accepting the customized text and may also store each accepted customized text in database 212 as the third set of texts.

In some embodiments, chat module 216 may be configured to retrieve a fourth set of texts. For example, chat module 216 may determine one or more categories associated with a livestream based on one or more products featured in the livestream. In some embodiments, each product featured in the livestream may have an associated predetermined category, and the livestream may be associated with the same product categories accordingly. In some embodiments, the one or more categories associated with the livestream may be set manually (e.g., by a seller, creator, or management entity). Based on the determined one or more categories, chat module 216 may retrieve, from the database, a fourth set of texts associated with the one or more categories. In some embodiments, the fourth set of texts may be a predetermined set of texts generated based on review keywords associated with products of particular categories. For example, chat module 216 may, for each category of all possible categories, determine top review keywords (i.e., keywords determined based on reviews stored in database 212) associated with the category by compiling all keywords for each product of all products associated with the category, and ranking all of the keywords by prevalence to determine the top keywords. Based on the top keywords, chat module 216 may be configured to automatically format each keyword into a category question, and store each category question associated with a particular category in database 212. Based on the determined one or more categories associated with the livestream, chat module 216 may retrieve the category questions associated with the one or more categories. Additionally or alternatively, chat module 216 may rank the category questions in order of prevalence and set the most prevalent category questions as the fourth set of texts.

In step 306, the at least one processor may be configured to transmit, to one or more user devices, a plurality of texts for display on one or more user interfaces associated with the one or more user devices. For example, in some embodiments, chat module 216 may transmit the plurality of texts including at least the first, second, third and/or fourth set of texts to one of the plurality of user devices, for display on a plurality of user interfaces. In some embodiments, each text of the plurality of texts may be displayed as a selectable user interface element and each text selectable user-interface element may include a maximum of a predetermined number of characters. For example, step 306 may comprise sending each text for display as a selectable chat bubble with less than or equal to 20 characters.

Figure 4A:
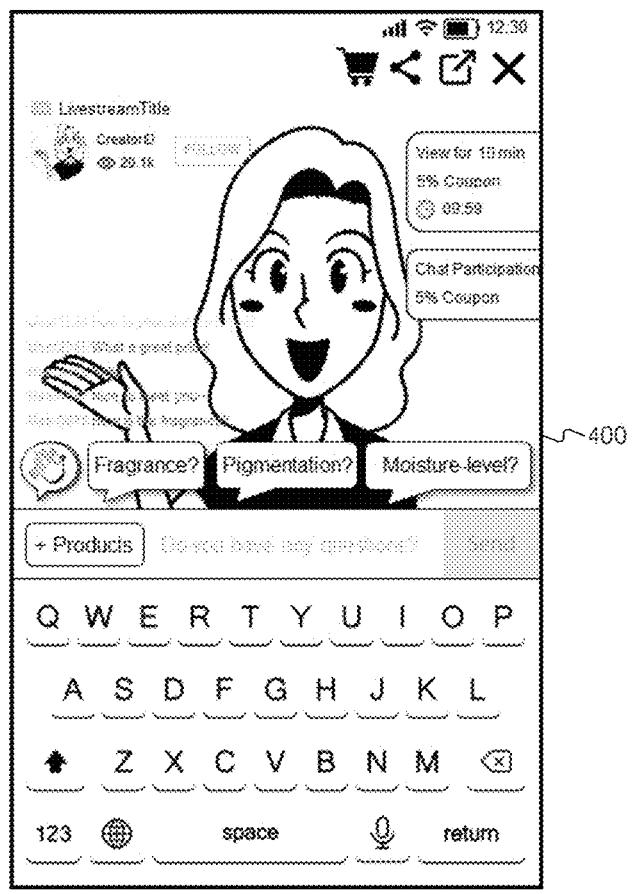
FIG. 4A is an exemplary customer chat interface displayed on a user device for livestream engagement enhancement, consistent with the disclosed embodiments.
Figure 4B:
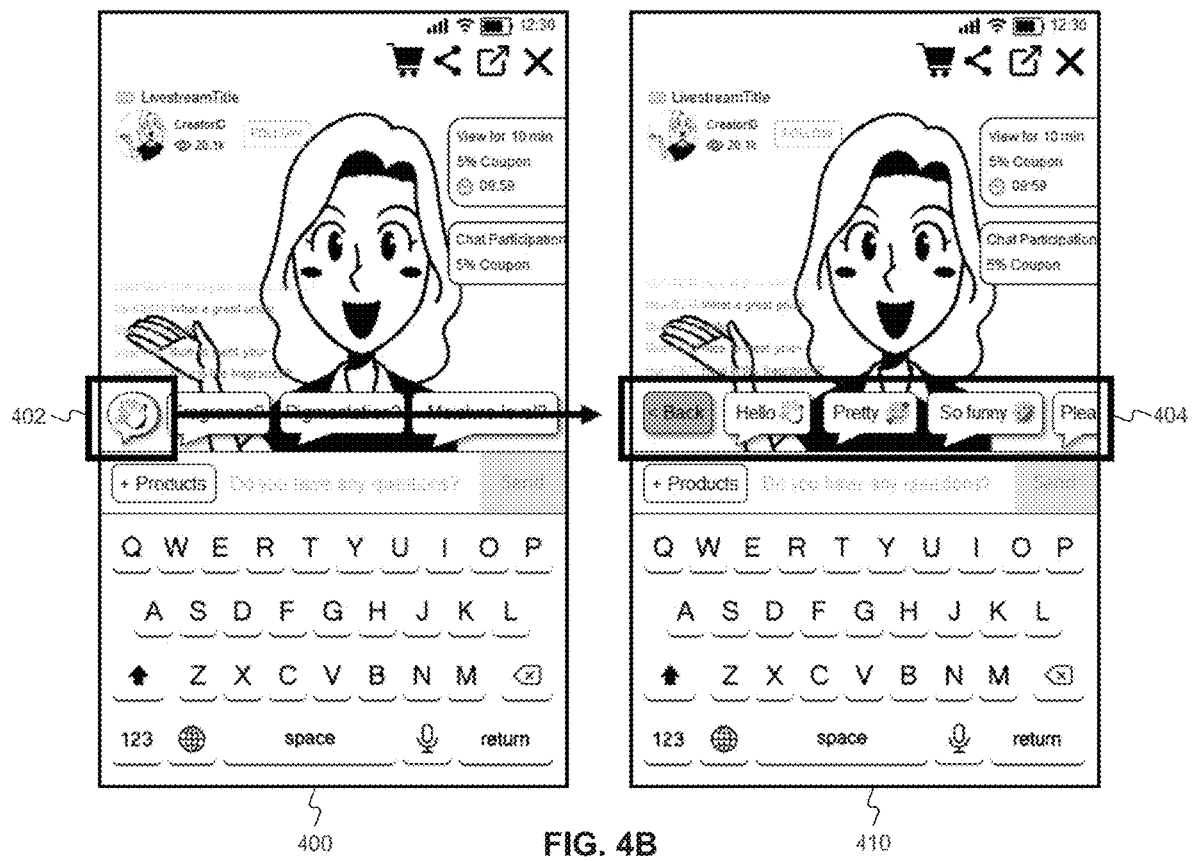
FIG. 4B depicts exemplary customer interfaces for livestream engagement enhancement displayed as a result of user interaction, consistent with the disclosed embodiments.

In some embodiments, the second set of texts may not be displayed on the first user interface when the first set of texts is displayed on the first user interface, or vice versa. For example, chat module 216 may be configured to set the default first user interface to display the second set of texts. When chat module 216 receives indication that a user has selected a certain user-interface element (e.g., an element with a "wave" emoticon, as shown in FIGS. 4A and 4B), chat module 216 may replace the second set of texts with the first set of texts. When chat module 216 receives indication that the user has selected another user-interface element (e.g., back button), chat module 216 may replace the first set of texts with the second set of texts. In another example, chat module 216 may set the default first user interface to display the first set of texts and when chat module 216 receives indication that a user has selected a certain user-interface element (e.g., back button), chat module 216 may replace the first set of texts with the second set of texts.

In step 308, the at least one processor may be configured to receive, during the livestream, user interaction data from at least one of the one or more user devices, wherein the user interaction data includes indication of user interaction by one or more users with at least one or more texts of the plurality of texts via at least one of the one or more user interfaces. For example, in some embodiments, chat module 216 may receive user interaction data from one or more user devices indicating that one or more texts of the first set of texts (e.g., greeting or reaction) have been selected. In a some embodiments, chat module 216 may receive user interaction data from one or more user devices indicating that one or more texts of the second set of texts (e.g., keyword question) have been selected. In some embodiments, chat module 216 may receive user interaction data from one or more user devices indicating that one or more texts of the third set of texts (e.g., customized text) have been selected. In some embodiments, chat module 216 may receive user interaction data from one or more user devices indicating that one or more texts of the fourth set of texts (e.g., category question) have been selected. In some embodiments, chat module 216 may receive user interaction data from one or more user devices indicating that one or more hand-typed texts have been transmitted, wherein the hand-typed texts are texts or emoticons personally typed by the one or more users in a chat element (e.g., chat box, chat bar) of the one or more user interfaces. In some embodiments, chat module 216 may receive user interaction data from one or more user devices indicating that a combination of texts of the first, second, third, fourth, and/or hand-typed texts have been selected.

In some embodiments, the at least one processor may be configured to determine, based on the received user interaction data, whether one or more conditions are met. For example, the received user interaction data may include texts received from user devices as well as a watch time for each user of the one or more users, a number of chats sent by each user of the one or more users, an overall number of users viewing the livestream, an overall number of chats (i.e., texts) sent, a number of likes, a number of purchases made by one or more users through the livestream, a number of subscriptions (e.g., users subscribed to the creator), etc. Based on live user interaction data, one or more users may receive rewards (e.g., discounts, coupons, etc.) on products featured in the livestream. For example, chat module 216 may keep track of the received user interaction data during a livestream to determine whether one or more conditions are met. Conditions may include a threshold number of views, number of purchases, watch time, number of chats, or the like. In some embodiments, conditions may be manually preset (e.g., by a seller, creator, or management entity).

In some embodiments, based on the determination of whether one or more conditions are met, the at least one processor may be configured to transmit, during the livestream, a notification message to one or more users of the one or more first users. For example, based on determining that one or more conditions have been met (e.g., exceeding the threshold number of views, number of purchases, number of chats, etc.), chat module 216 may generate and transmit a notification message to each user device associated with a user eligible to receive a reward. In some embodiments, different conditions may result in different user devices to send notification messages to (e.g., users eligible to receive a reward for meeting a first condition may be different from users eligible to receive a reward for meeting a second condition).

In step 310, the at least one processor may be configured to transmit each text of the one or more texts to a second user device for display on at least one of a first page or a second page of a second user interface associated with the second user device. In some embodiments, transmitting the one or more texts may be based on determining a text type (e.g., question, commentary, emoticon, etc.) of each text. For example, chat module 216 may determine whether the text is a question type by using a text detection algorithm (e.g., detecting a "?"). In some embodiments, chat module 216 may determine the text type of a text by using natural language processing. For example, a text (e.g. hand-typed text) may not explicitly include a question mark, but may be written in question format (e.g., "how is the smell"), which may indicate that the text is a question type. Based on determining that the text includes a question using natural language processing, chat module 216 may transmit the text to the second user device with instructions to display the text on a particular page of a second user interface associated with the second user device. For example, based on determining that the text is not a question type, chat module 216 may transmit the text for display on a first page of the second user interface. On the other hand, based on determining that the text is a question type, chat module 216 may transmit the text for display on both the first page as well as a second page of the second user interface, wherein the second page is separate from the first page and may allow all questions to be organized into a single page. For example, when transmitting the text to the second user device (i.e., creator device), chat module 216 may include instructions to cause a second user device to automatically organize a plurality of transmitted texts into different sections on the second user interface and thus provide an improved user interface for electronic devices. In some embodiments, chat module 216 may be configured to determine a product associated each question. For example, chat module 216 may determine, based on the question being sent while a particular product is being discussed by the creator, that the question is associated with the product being currently discussed.

FIGS. 4A, 4B, 5A-5D, 6A, 6B, 7A, 7B, 8A, 8B, and 9 depict exemplary user interfaces for livestream engagement enhancement. With reference to FIGS. 4A, 4B, 5A-5D, 6A, 6B, 7A, 7B, 8A, 8B, and 9, in some embodiments, a user device may execute a livestream application capable of presenting various types of interactive content for a user.

As shown in FIG. 4A, interface 400 may be an exemplary chat interface displayed on a user device associated with a first user (i.e., customer). For example, interface 400 may include a keyboard for typing and text bubbles (e.g., text bubbles labeled "Fragrance?" "Pigmentation?" "Moisture-level?") with keywords (e.g., second, third, and/or fourth set of texts) for selection. FIG. 4B depicts how interface 400 changes to interface 410 with selectable elements 404 based on selection of button 402. For example, button 402 may be selectable to display elements 404 (e.g., first and/or third set of texts with greetings, reactions, and/or customized text). In some embodiments, selection of the text bubble with "<Back" of elements 404 may cause the user device to display interface 400.

Figure 5A:
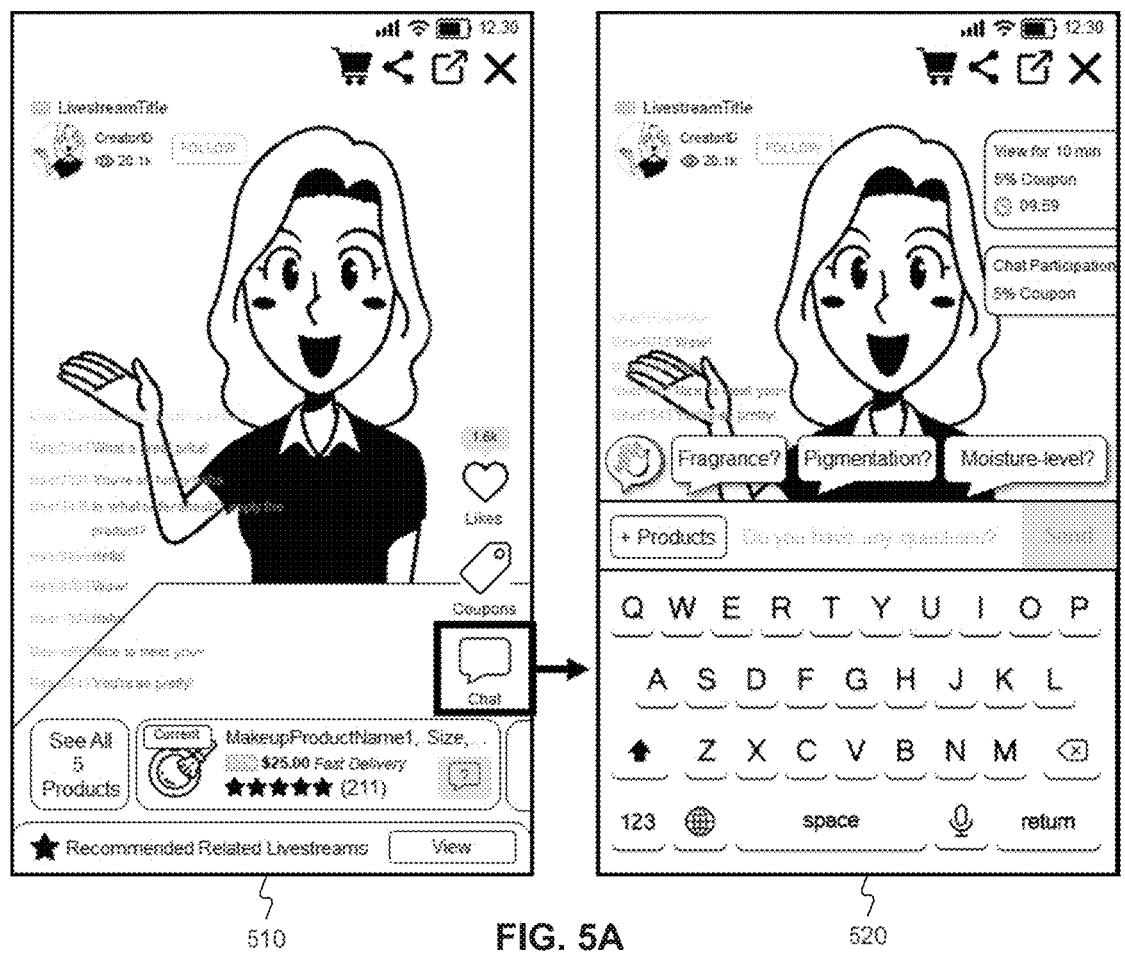
FIG. 5A depicts exemplary default customer interfaces for livestream engagement enhancement, consistent with the disclosed embodiments.
Figure 5B:
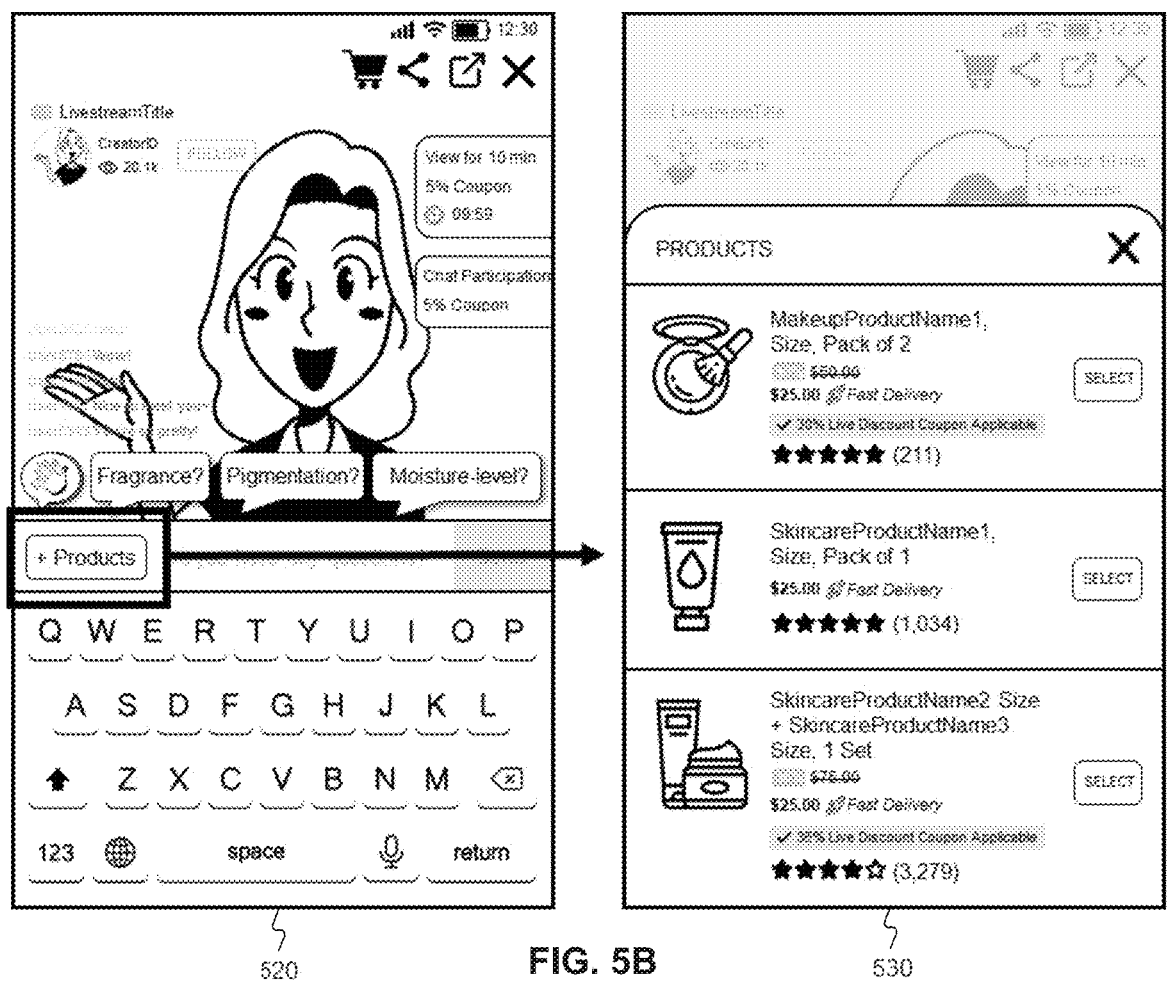
FIG. 5B depicts exemplary customer interfaces for livestream engagement enhancement displayed as a result of user interaction, consistent with the disclosed embodiments.
Figure 5C:
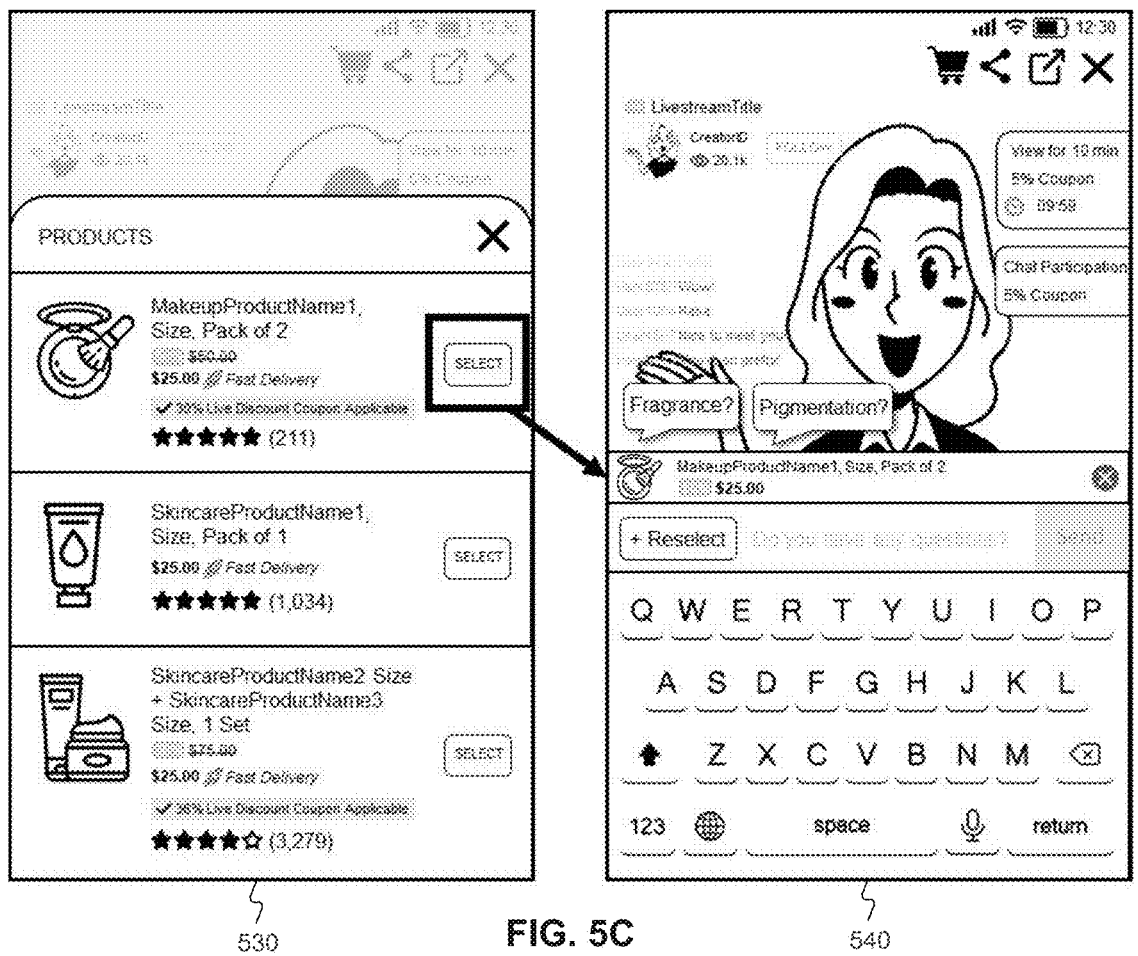
FIG. 5C depicts exemplary customer interfaces for livestream engagement enhancement displayed as a result of user interaction, consistent with the disclosed embodiments.

FIG. 5A-5D depict exemplary user interfaces displayed on a user device as a result of receiving indication of selection of particular displayed elements. For example, as shown in FIG. 5A, interface 510 may be an exemplary default interface displayed on a user device associated with a first user upon entering a livestream. Upon receiving indication of selection of the "Chat" UI element, interface 520 (similar to interface 400 of FIGS. 4A and 4B) may be displayed on the user device. As shown in FIG. 5B, based on selection of the element labeled "+Products" of interface 520, interface 530 may be displayed with a list of products featured in the livestream. Each product is displayed with an element labeled "SELECT," which, when selected, causes interface 540 to be displayed as shown in FIG. 5C. Interface 540 includes a specific set of text bubbles for the particular product (i.e., text bubbles labeled "Fragrance?" "Pigmentation?") that may be generated by chat module 216 in a manner consistent with the disclosed embodiments. When indication of selection of a text bubble (e.g., text bubble labeled "Fragrance") is received, chat module 216 may be configured to reformat the text within the text bubble into a full question (e.g., "How is the fragrance?") as shown in interface 540 of FIG. 5D. For example, chat module 216 may be configured to use natural language processing to formulate the text within the text bubble into a full question.

Figure 5D:
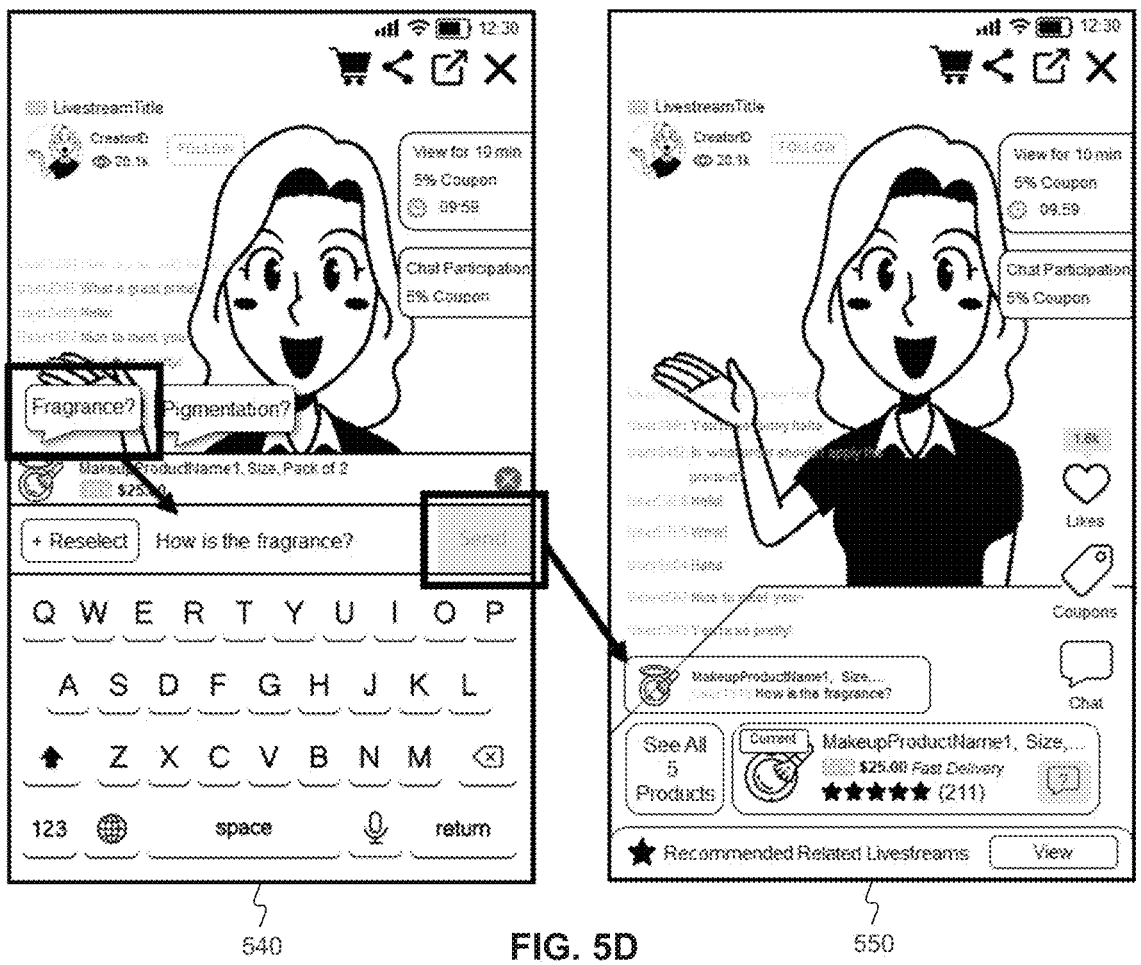
FIG. 5D depicts exemplary customer interfaces for livestream engagement enhancement displayed as a result of user interaction, consistent with the disclosed embodiments.

Once the "Send" element of interface 540 is selected, the question associated with the product is displayed as shown in interface 550 of FIG. 5D.

Figure 6A:
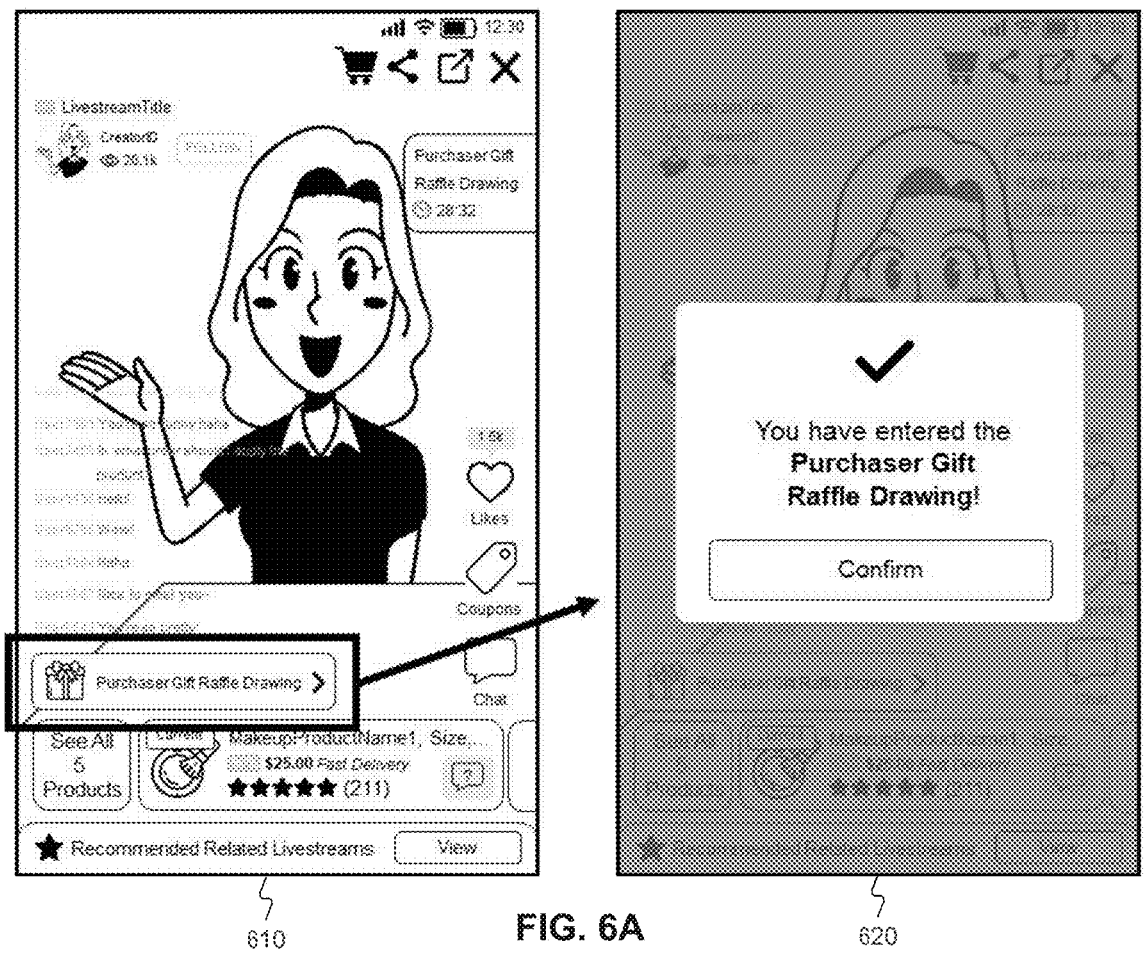
FIG. 6A depicts exemplary customer interfaces for livestream engagement enhancement, consistent with the disclosed embodiments.
Figure 6B:
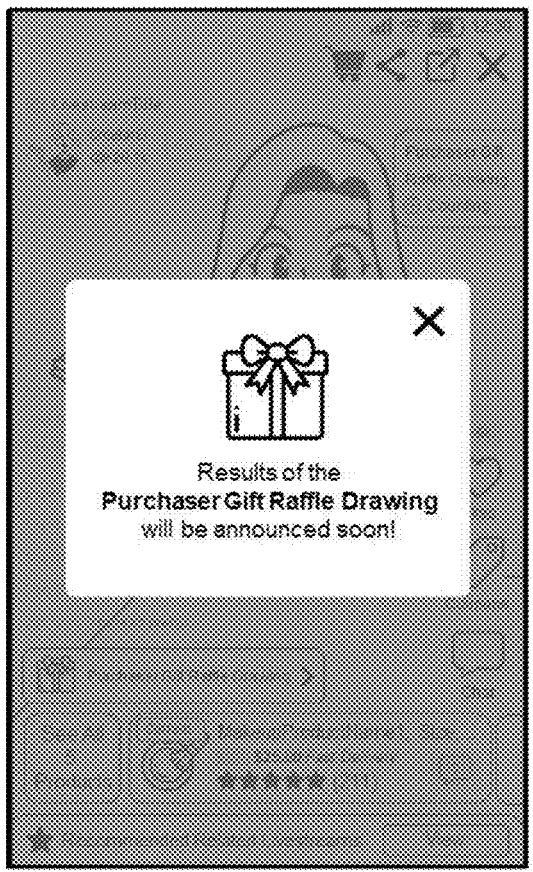
FIG. 6B depicts exemplary customer interfaces displaying exemplary notifications for livestream engagement enhancement, consistent with the disclosed embodiments.
Figure 6B:
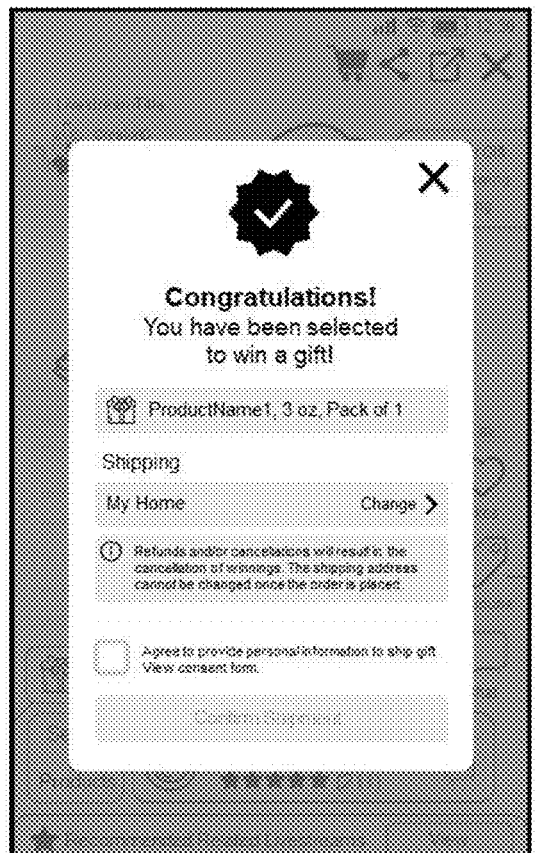

FIGS. 6A-6B depict exemplary user interfaces displayed on a user device for a raffle drawing. For example, as shown in FIG. 6A, interface 610 may be an exemplary default interface displayed on a user device associated with a first user. In some embodiments, interface 610 may be an exemplary interface displayed after receiving indication that the first user has purchased a product featured in the livestream (i.e., meeting a condition as discussed above with respect to FIG. 3) and may include a "Purchaser Gift Raffle Drawing" element for the user to participate in a raffle drawing to win a gift. Upon receiving indication of selection of the "Purchaser Gift Raffle Drawing" element, interface 620 with a notification of successful participation in the raffle drawing may be displayed. While the livestream is being livestreamed and once the time to enter the raffle ends, interface 630 with an automatic notification that the results of the raffle drawing will be announced soon is displayed as shown in FIG. 6B. Based on the first user being selected to win a gift, interface 640 may display a notification indicating that the first user has been selected and provides the first user with options to either accept the gift or ignore the notification (i.e., select "X" on the top right corner of the notification).

Figure 7A:
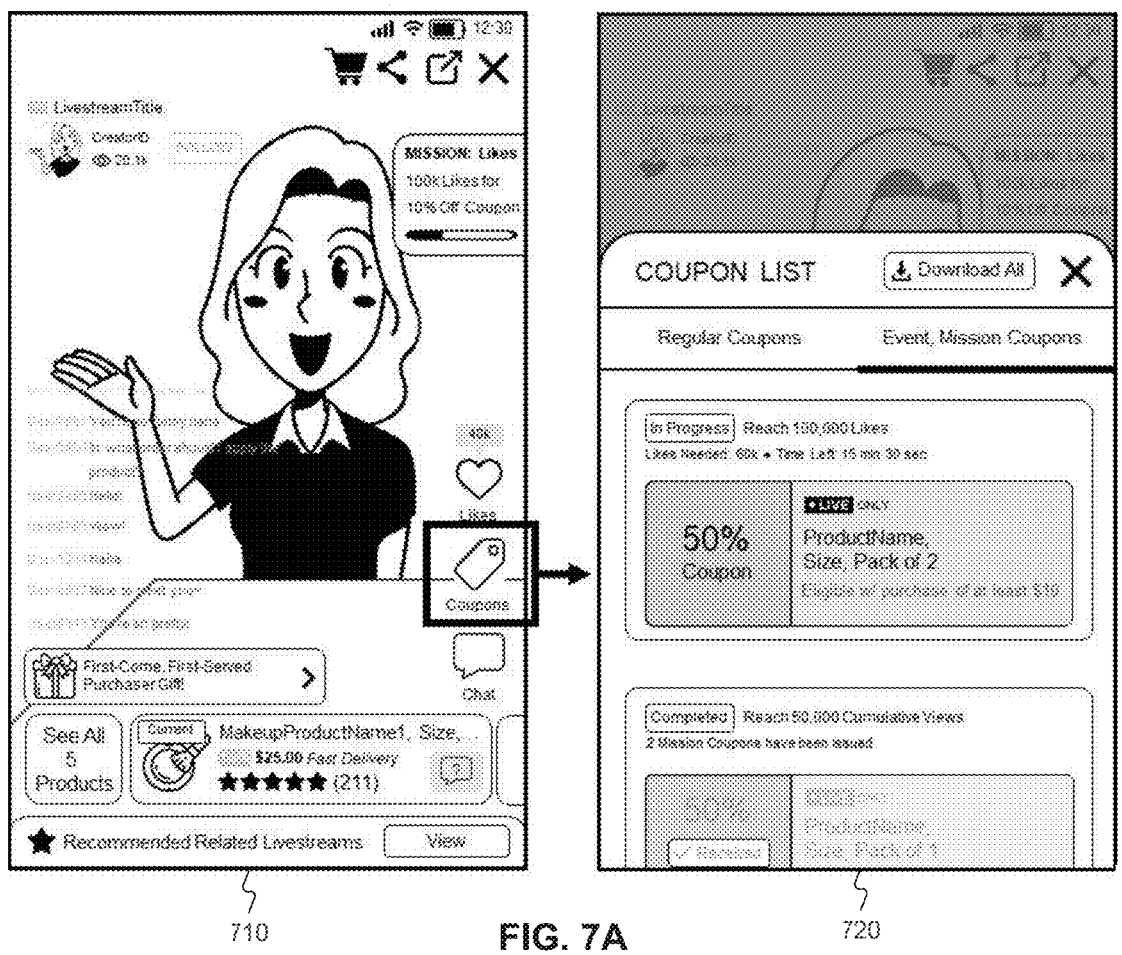
FIG. 7A depicts exemplary customer interfaces for livestream engagement enhancement, consistent with the disclosed embodiments.
Figure 7B:
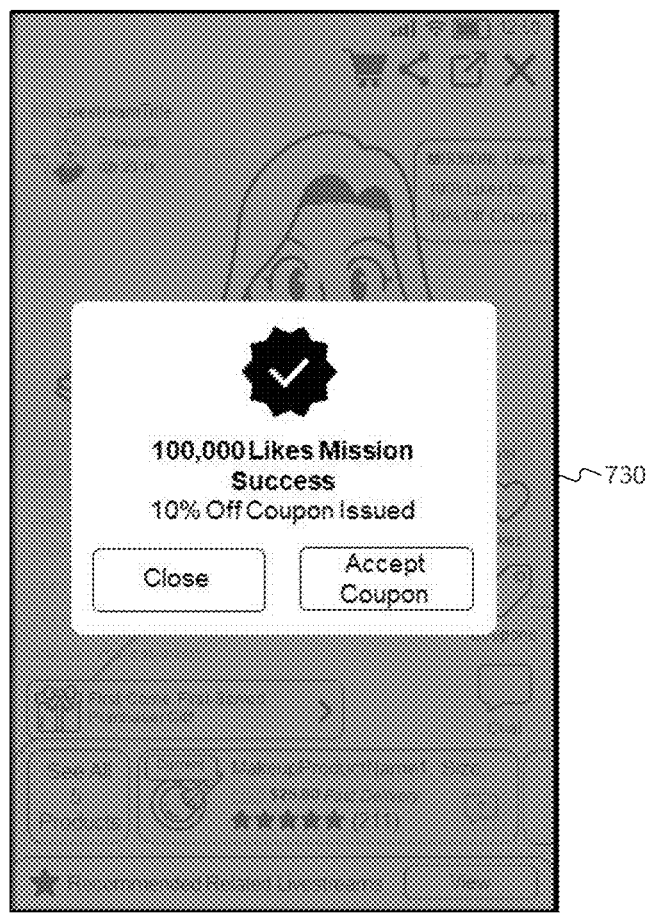
FIG. 7B depicts an exemplary customer interface displaying an exemplary notification for livestream engagement enhancement, consistent with the disclosed embodiments.

FIGS. 7A-7B depict exemplary user interfaces displayed on a user device to access coupons. For example, as shown in FIG. 7A, interface 710 may be an exemplary default interface displayed on a user device associated with a first user. Upon receiving indication of selection of the "Coupons" element, interface 720 with a list of coupons may be displayed. In some embodiments, a seller associated with a product may define one or more coupons for the product. For example, livestream server 210 may receive input including coupon instructions for one or more products from one or more seller devices, wherein the coupon instructions define necessary requirements for users (i.e., customers) to acquire one or more coupons associated with products featured in livestreams. In some embodiments, the coupon instructions may be stored in database 212. Additionally or alternatively, chat module 216 may automatically generate coupons based on real-time user interactions. For example, based on detecting that the first user's interactions with a particular product via the user device has exceeded a predetermined threshold, interface 720 with the list of coupons may automatically refresh to include a new coupon available to the first user based on exceeding the predetermine threshold. In some embodiments, the list of coupons may include both available (i.e. "In Progress") coupons and completed or past coupons featured in the livestream. The coupons may specify the discount amount, product name, size of the product, number of product packs included, any conditions that must be met to receive the coupon, and time left to achieve the condition. FIG. 7B depicts an exemplary user interface 730 with an exemplary notification that may be displayed upon achieving the condition (i.e., completing the mission) to receive the coupon. The notification may include options to ignore (i.e., close) the notification or accept the coupon.

Figure 8A:
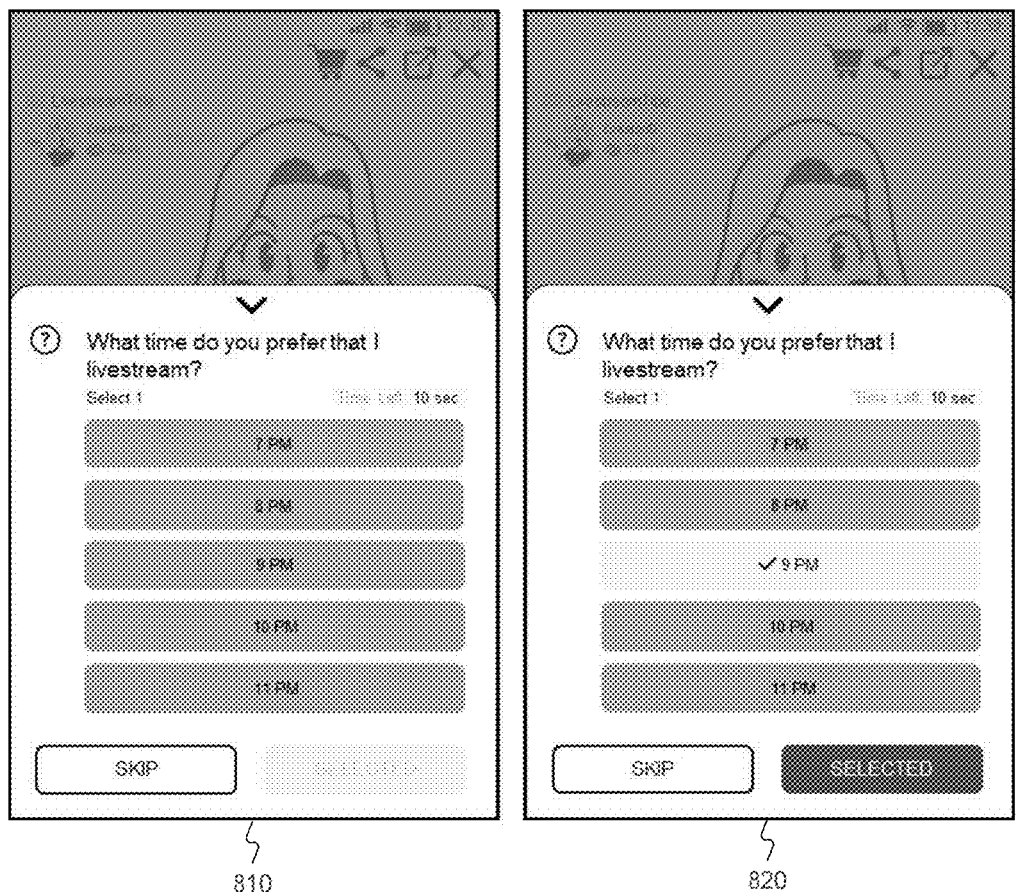
FIG. 8A depicts exemplary customer interfaces for livestream engagement enhancement, consistent with the disclosed embodiments.
Figure 8B:
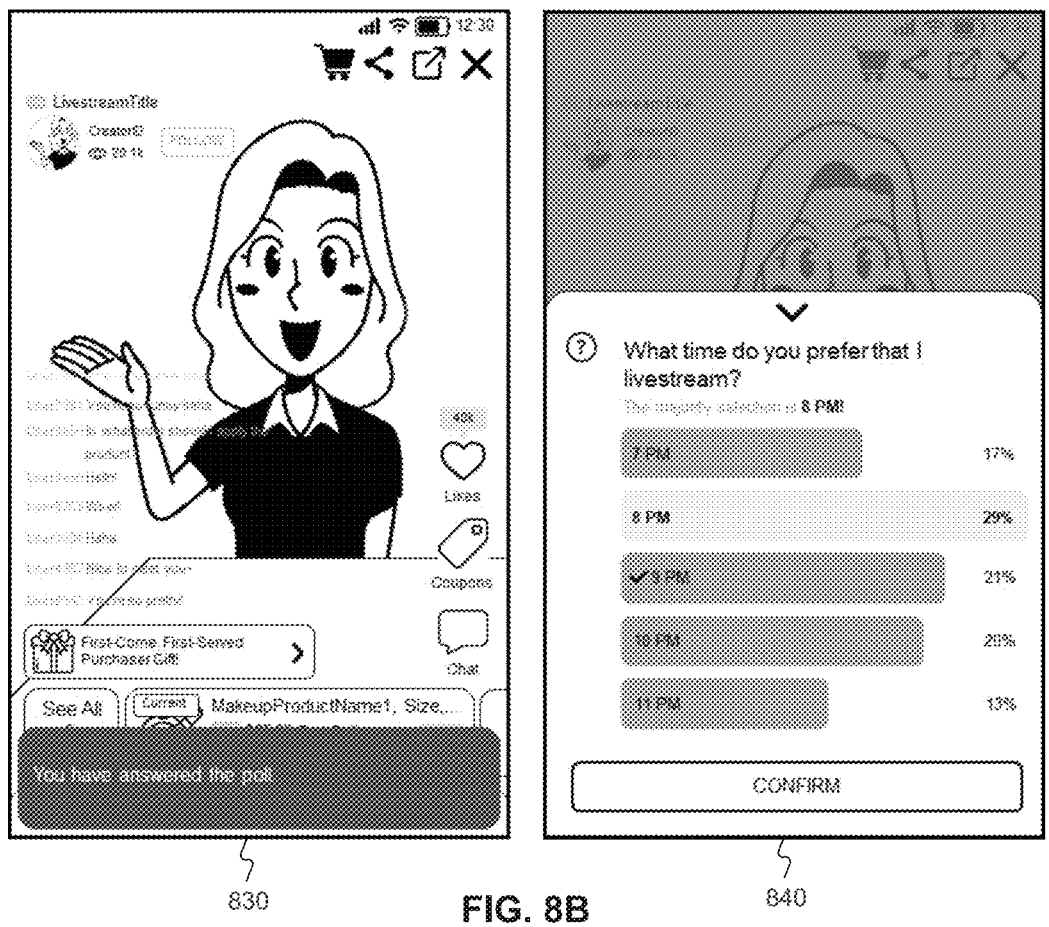
FIG. 8B depicts exemplary customer interfaces for livestream engagement enhancement displayed as a result of customer interaction, consistent with the disclosed embodiments.

FIGS. 8A-8B depict exemplary user interfaces displayed on a user device for polling. For example, as shown in FIG. 8A, interface 810 may include an exemplary poll that is automatically displayed during a livestream. In some embodiments, the poll may be displayed in response to receiving instructions from a user device associated with a second user (i.e., creator). Interface 810 may include options for the first user to skip the poll, hide the poll (i.e., downward arrow at the top of the poll), or select an answer option. In some embodiments, the option to select the "SELECTED" element may be unavailable until indication of selection of an answer option is received. Additionally, interface 810 may include a poll question, instructions for response (i.e., "Select 1"), and the time left to answer the poll. Based on receiving indication of selection of an answer option, interface 820 indicating the option selected may be displayed along with the option to press the "SELECTED" element. Once indication is received that the "SELECTED" element is selected, the poll may disappear and a notification indicating that the first user has answered the poll may be displayed as shown in interface 830 of FIG. 8B. In some embodiments, interface 840 may automatically be displayed once the time left to answer the poll ends. In some embodiments, interface 840 may be displayed in response to receiving instructions from the user device associated with the second user. Interface 840 may display the results of the poll (e.g., statistics associated with each answer, majority answer) and include options for the first user to confirm the results or hide the poll.

Figure 9:
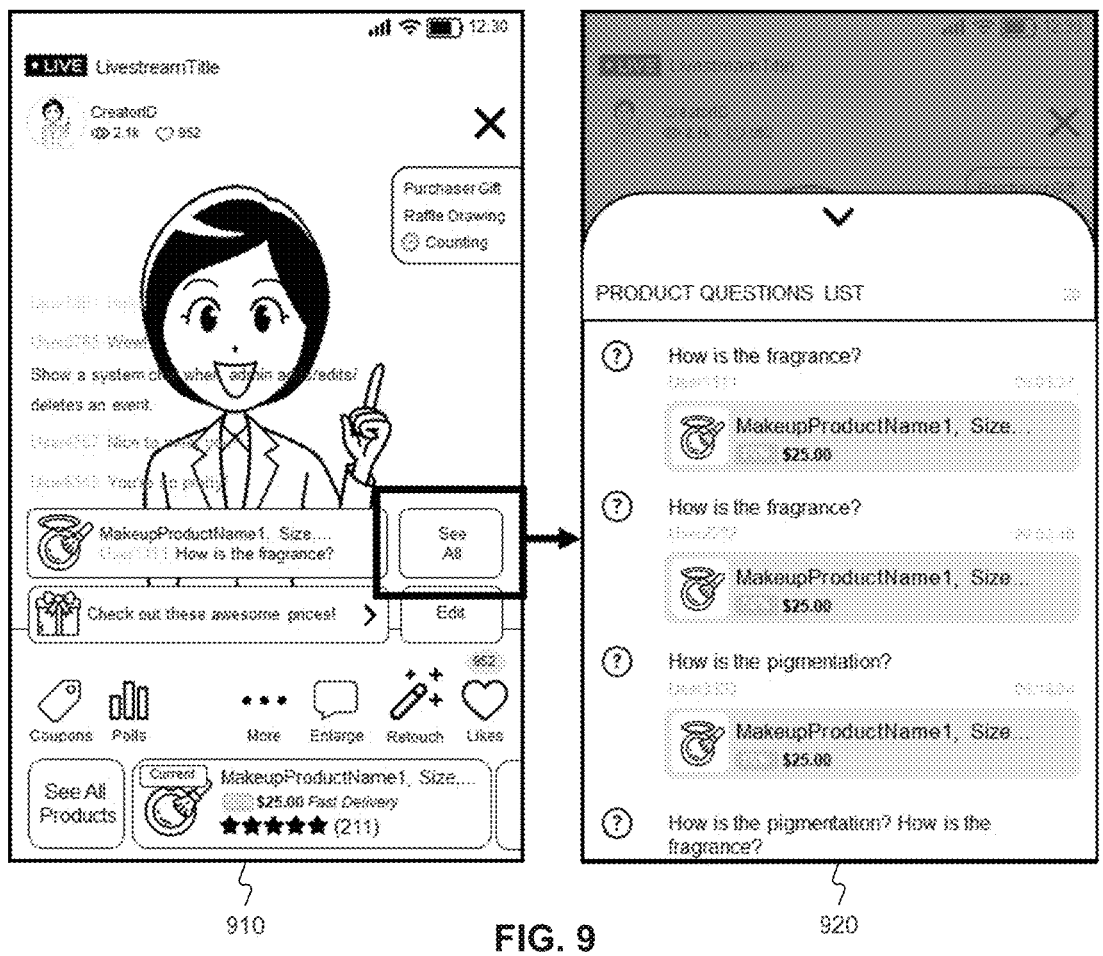
FIG. 9 depicts exemplary user interfaces for livestream engagement enhancement, consistent with the disclosed embodiments.

FIG. 9 depicts exemplary user interfaces displayed on a user device associated with a second user (i.e., creator). Interface 910 may be an exemplary default interface displayed on a user device associated with a second user. In some embodiments, interface 910 may include an option for the second user to see all questions associated with one or more products featured in the livestream. For example, in response to receiving indication of selection of the "See All" element, interface 920 including a list of product questions may be displayed. In some embodiments, interface 920 may include the questions, a userID associated with each question, a time each question was received, and/or details of a product associated with the question. In some embodiments, the "See All" element as well as interface 920 may be limited for display only on the second user device (i.e., not available for display on the first user device). In some embodiments, interface 920 may include an element to "Retouch" or automatically enhance the visual conditions of the creator (e.g., corrections to lighting, colors, contrast, skin, makeup, etc.). In some embodiments, interface 920 may include a chat section displaying chats sent by users viewing the second user's livestream. Additionally or alternatively, the chat section may include automatically generated event messages indicating that the second user has added, edited, or deleted an event (e.g., discount event, coupon event, gift event, etc.). For example, when the second user starts a new event, the chat section may display a message indicating that the second user has added an event. In some embodiments, the event messages may only be displayed on the second user interface (e.g., not displayed on customer interfaces). In some embodiments, the event messages may be displayed on all user interfaces presenting the livestream.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for livestream engagement enhancement, the system comprising:
   one or more memory devices storing instructions; and
   one or more processors configured to execute the instructions to perform operations comprising:
      retrieving, from a database, a first set of texts;
      retrieving, for each product of one or more products featured in a livestream, a second set of texts, wherein the second set of texts is generated by:
         compiling a plurality of keywords in review data associated with the product;
         determining a prevalence value associated with each keyword;
         selecting one or more keywords based on the determined prevalence value associated with each keyword;
         organizing the selected one or more keywords; and
         storing, in the database, the organized keywords as the second set of texts;
      transmitting a plurality of texts including at least the first and second set of texts for display as a plurality of selectable bubbles on one or more user interfaces associated with one or more user devices;
      receiving user interaction data from at least one of the one or more user devices, wherein the user interaction data includes indication of selection by one or more users of one or more selectable bubbles of the plurality of selectable bubbles associated with one or more texts of the plurality of texts via at least one of the one or more user interfaces; and
      transmitting each text of the one or more texts to a second user device for display on at least one of a first page or a second page of a second user interface associated with the second user device, wherein transmitting is based on:
determining a text type of the text;
based on the text not being a first text type, transmitting the text for display on the first page of the second user interface; and
based on the text being a first text type, transmitting the text for display on the second page of the second user interface.

2. The computer-implemented system of claim 1,
wherein determining a prevalence value associated with each keyword comprises counting a number of times each keyword was mentioned in the review data, and
wherein selecting one or more keywords based on the determined prevalence value associated with each keyword comprises selecting a predetermined number of keywords with the highest prevalence values based on the determined prevalence value associated with each keyword.

3. The computer-implemented system of claim 1, wherein organizing the selected one or more keywords includes removing keywords included in a first set of omitted keywords.

4. The computer-implemented system of claim 1, wherein the instructions further comprise displaying the first set of texts on the first user interface, and not displaying the second set of texts on the first user interface.

5. The computer-implemented system of claim 1, the one or more processors further configured to execute the instructions to perform operations comprising:
retrieving a third set of texts, wherein the third set of texts is generated by:
receiving, from the second user device, one or more customized texts;
for each customized text of the one or more customized texts:
filtering the customized text to determine whether the customized text is restricted;
based on the customized text being restricted, transmitting a notification message to the second user device; and
based on the customized text not being restricted, including the customized text in the third set of texts.

6. The computer-implemented system of claim 1, the one or more processors further configured to execute the instructions to perform operations comprising:
determining one or more categories associated with a livestream based on one or more products featured in the livestream; and
based on the determined one or more categories, retrieving, from the database, a fourth set of texts associated with the one or more categories.

7. The computer-implemented system of claim 1, wherein determining a text type of the text comprises natural language processing.

8. The computer-implemented system of claim 1, wherein each text is displayed as a selectable user interface element.

9. The computer-implemented system of claim 8, wherein each selectable user-interface element includes a maximum of 20 characters.

10. The computer-implemented system of claim 1, wherein the first set of texts includes a predetermined set of greetings or reactions.

11. A computer-implemented method for livestream engagement enhancement, comprising:
retrieving, from a database, a first set of texts;
retrieving, for each product of one or more products featured in a livestream, a second set of texts, wherein the second set of texts is generated by:
compiling a plurality of keywords in review data associated with the product;
determining a prevalence value associated with each keyword;
selecting one or more keywords based on the determined prevalence value associated with each keyword;
organizing the selected one or more keywords; and
storing, in the database, the organized keywords as the second set of texts;
transmitting a plurality of texts including at least the first and second set of texts for display as a plurality of selectable bubbles on one or more user interfaces associated with one or more user devices;
receiving user interaction data from at least one of the one or more user devices, wherein the user interaction data includes indication of selection by one or more users of one or more selectable bubbles of the plurality of selectable bubbles associated with one or more texts of the plurality of texts via at least one of the one or more user interfaces;
transmitting each text of the one or more texts to a second user device for display on at least one of a first page or a second page of a second user interface associated with the second user device, wherein transmitting is based on:
determining a text type of the text;
based on the text not being a first text type, transmitting the text for display on the first page of the second user interface; and
based on the text being a first text type, transmitting the text for display on the second page of the second user interface.

12. The computer-implemented method of claim 11,
wherein determining a prevalence value associated with each keyword comprises counting a number of times each keyword was mentioned in the review data, and
wherein selecting one or more keywords based on the determined prevalence value associated with each keyword comprises selecting a predetermined number of keywords with the highest prevalence values based on the determined prevalence value associated with each keyword.

13. The computer-implemented method of claim 11, wherein organizing the selected one or more keywords includes removing keywords included in a first set of omitted keywords.

14. The computer-implemented method of claim 11, wherein when the first set of texts is displayed on the first user interface, the second set of texts is not displayed on the first user interface.

15. The computer-implemented method of claim 11, further comprising:
retrieving a third set of texts, wherein the third set of texts is generated by:
receiving, from the second user device, one or more customized texts;
for each customized text of the one or more customized texts:
filtering the customized text to determine whether the customized text is restricted;
based on the customized text being restricted, transmitting a notification message to the second user device; and based on the customized text not being restricted, including the customized text in the third set of text.

16. The computer-implemented method of claim 11, further comprising:
determining one or more categories associated with a livestream based on one or more products featured in the livestream; and
based on the determined one or more categories, retrieving, from the database, a fourth set of texts associated with the one or more categories.

17. The computer-implemented method of claim 11, wherein determining a text type of the text comprises using natural language processing.

18. The computer-implemented method of claim 11, wherein each text is displayed as a selectable user interface element that includes a maximum of 20characters.

19. The computer-implemented method of claim 11, wherein the first set of texts includes a predetermined set of greetings or reactions.

20. A computer-implemented system for livestream engagement enhancement, the system comprising:
one or more memory devices storing instructions; and
one or more processors configured to execute the instructions to perform operations comprising:
retrieving, from a database, a first set of texts;
retrieving, for each product of one or more products featured in a livestream, a second set of texts, wherein the second set of texts is generated by:
compiling a plurality of keywords in review data associated with the product;
determining a prevalence value associated with each keyword;
selecting one or more keywords based on the determined prevalence value associated with each keyword;
organizing the selected one or more keywords; and
storing, in the database, the organized keywords as the second set of texts;
transmitting, during the livestream, a plurality of texts including at least the first and second set of texts for display as a plurality of selectable bubbles on a plurality of user interfaces associated with a plurality of user devices;
receiving, during the livestream, user interaction data from one or more user devices of the plurality of user devices, wherein the user interaction data includes indication of selection by one or more users of one or more selectable bubbles of the plurality of selectable bubbles associated with one or more texts of the plurality of texts via at least one or more interfaces of the plurality of user interfaces;
determining, based on the received user interaction data, whether one or more conditions are met; and
based on the determination, transmitting, during the livestream, a notification message to one or more second users of the one or more first users.

* * * * *